W. F. ROGERS
STOVE
April 26, 1932. Re. 18,439
Original Filed Oct. 4, 1930
Fig. 1.
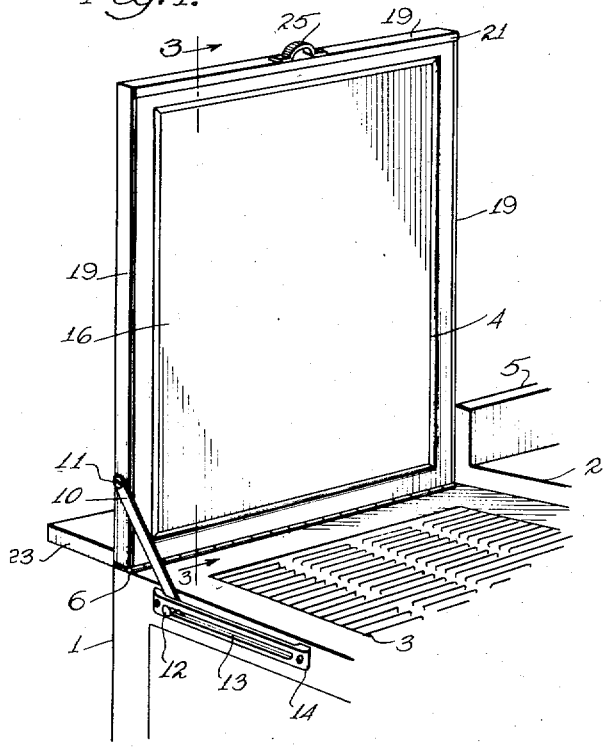
Fig. 2.
Fig. 3.
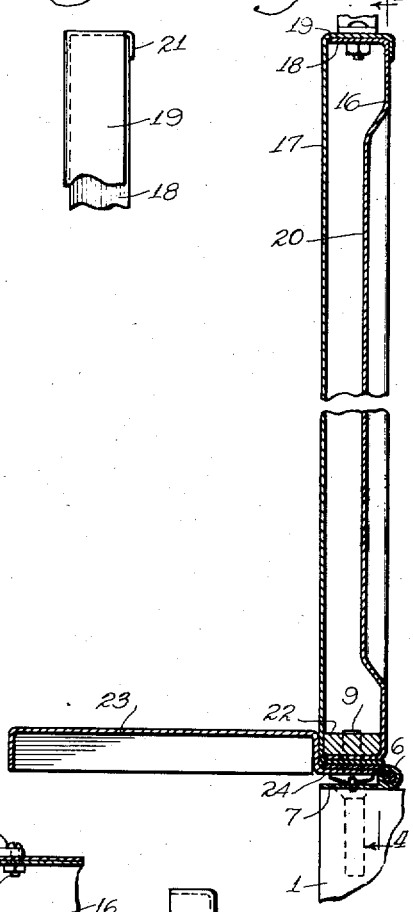
Fig. 4.
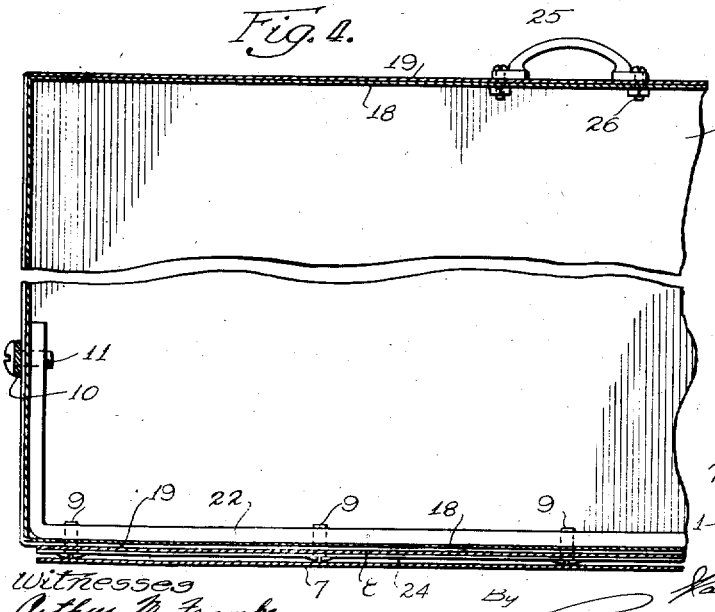
Fig. 5.
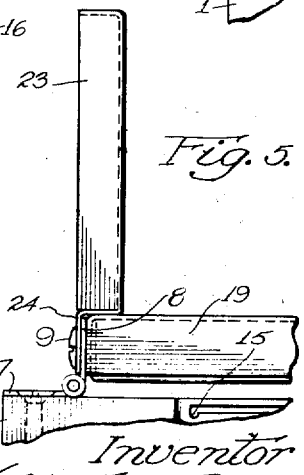
Witnesses
Arthur M. Franke.
Ira E. Anderson.
Inventor
Walter F. Rogers,
By Rumble, Rumble & Woodworth,
Attys.

Reissued Apr. 26, 1932

Re. 18,439

UNITED STATES PATENT OFFICE

WALTER F. ROGERS, OF OAK PARK, ILLINOIS, ASSIGNOR TO CROWN STOVE WORKS, OF CICERO, ILLINOIS, A CORPORATION OF ILLINOIS

STOVE

Original No. 1,831,546, dated November 10, 1931, Serial No. 486,400, filed October 4, 1930. Application for reissue filed March 3, 1932. Serial No. 596,664.

The main objects of this invention are to provide a range having an improved form of hinged cover adapted to overlie the top burners for concealing them when they are not in use, and adapted to serve as a back splasher plate when the burners are in use; to provide a cover of this kind having an improved form of guard or fence to prevent utensils and other articles from being shoved over the rear edge of the stove; to provide improved manually releasable means for securing said cover in upright position when it is used as a splasher; and to provide a fabricated cover of this kind having an improved arrangement of sheet metal parts adapted to present a neat appearance when assembled.

An illustrative embodiment of this invention is shown in the accompanying drawings, wherein:

Figure 1 is a fragmentary perspective of a gas range having an improved hinged cover which is shown in its open position.

Fig. 2 is an enlarged detail in elevation showing the outer end of the cover.

Fig. 3 is an enlarged section, partly broken away; the view being taken on the line 3—3 of Fig. 1.

Fig. 4 is a section, partly broken away, the view being taken on the line 4—4 of Fig. 3.

Fig. 5 is an enlarged detail in elevation, showing the guard on the inner end of the cover.

The improved cover to which this invention is applied is adapted for use in connection with many different forms of ranges. Inasmuch as this invention relates mainly to the cover, the accompanying drawings illustrates only such other portions of the stove as are believed helpful in apprehending the invention.

In the form herein shown, the invention is applied to a gas range comprising a frame 1 having mounted thereon a fixed cover 2 overlying the usual baking oven, not shown, and a burner top 3 supported alongside the fixed cover and adapted to be concealed, when not in use, by an improved hinged cover 4. The usual guard or fence 5 extends along the rear edge of the cover 2 and the customary burners, not shown, are located directly below the burner top 3. As illustrated in Fig. 1, the burner top 3 is located slightly below the level of the fixed cover 2, so as to permit the improved hinged cover 4 to lie substantially flush with the fixed cover 2 when the hinged cover is closed.

Extending along the rear edge of the frame 1, rearwardly of the burner top 3, is a piano hinge 6 having one leaf 7 attached to the frame and having its other leaf 8 attached to the cover 4 by screws 9.

The hinged cover 4 is adapted to be held in its upright position by a manually releasable latch 10, having one end thereof pivotally secured to the hinged cover by a screw 11. The outer end of the latch has a knob 12 which rides in a guide slot 13 formed in a keeper 14 which is fastened to the side of the stove adjacent the burner top. A depression 15 is formed at one end of the slot 13 for receiving the knob 12.

Ranges are generally constructed of sheet metal panels secured to cast metal parts. The sheet metal parts, particularly those on the outside of the stove, are usually enameled. The enameling of sheet metal parts should always be effected before the sheet metal is attached to any cast metal part. If this is not done, the sheet metal is apt to warp, due to the unequal expansion of sheet metal and cast metal when subjected to the heat of the enameling ovens.

After sheet metal parts are enameled, they cannot be welded together because the welding would injure the enamel finish. For this reason, the enameled panels of ranges are usually secured to one another and to the cast frames by bolts and screws. Bolts and screws often detract from the ornamental appearance of a stove and, for this reason, it is desirable to position them in places where they are not visible from the front and sides of the stove.

In the form herein shown, the improved hinged cover 4 comprises separately formed sheet metal panels which are enameled and then connected together as a unit without the use of visible bolts and screws.

Referring to the drawings, the improved hinged cover comprises a pair of enameled sheet metal panels 16 and 17, which are formed with telescoping rims 18 and 19, respectively. If desired, the panel 16 may be dished, as illustrated at 20. In order to secure the outer ends of the panels together without the necessity of screws, the rim 19 has an inwardly projecting retaining flange 21, which is positioned so as to engage the outer face of the panel 16.

Located between the panels 16 and 17, adjacent the hinge, is an L-shaped reinforcing bar 22 which is secured to the telescoping rims by the screws 9.

Extending along the inner edge of the cover, is a sheet metal fence 23 having a flange 24 which is secured to the telescoping rims by the screws 9. In the form shown, the leaf 8 of the hinge is clamped between the flange 24 and the rim 19. The fence 23 is arranged so as to be alined with the fence 5 when the hinged cover is closed.

The hinged cover is provided wth a handle 25 secured to the telescoping rims by bolts 26.

To assemble this improved hinged cover, the outer edge of the panel 16 is inserted into the channel formed at the outer edge of the panel 17. While the inner edges of the panels are separated from each other, the bolts 26 are inserted for attaching the handle 25. The reinforcing bar 22 is then placed between the panels and the latch 10 is attached to the bar 22 and to the rims by the screw 11. The fence 23 and hinge leaf 8 are then secured to the telescoping rims and to the bar 22 by the screws 9.

With this improved construction, the only screws which are necessary for securing the cover panels together are the screws 9 and these are invisible.

Although but one specific embodiment of this invention has been herein shown and described, it will be understood that numerous details of the construction shown may be altered or omitted without departing from the spirit of this invention as defined by the following claims:

I claim:

1. A range comprising a frame, a fixed horizontal cover mounted on said frame, a horizontal burner top arranged alongside said fixed cover below the plane of the upper surface of said cover, a hinge extending along the rear edge of said burner top, a movable cover mounted on said hinge, said movable cover being shiftable to a vertical position to serve as a splasher and being shiftable to a horizontal position to overlie and rest upon said burner top, and a pair of separate fences extending along the rear edges of said covers respectively, the fence on said hinged cover being alined with the fence on said fixed cover when said hinged cover is closed.

2. In a range, the combination with a frame having a burner top thereon, of a cover having one edge hinged to said frame so as to permit said cover to move into position to overlie said burner top, said cover comprising a pair of sheet metal panels having telescoping rims, bolts extending through said rims at the outer edge of said cover, a handle secured to said bolts, and a retaining flange formed on the rim of one of said panels at the outer edge of said cover and positioned so as to engage the outer face of the other of said panels.

3. In a range, the combination with a frame having a burner top thereon, of a hinged cover movable into position to overlie said burner top, said cover comprising a pair of sheet metal panels having telescoping rims, a fence secured to said rims and projecting above the upper surface of said cover at the inner edge thereof, and a hinge having one leaf secured to said frame and having another leaf secured to said rims and to said fence.

4. In a range, the combination with a frame having a burner top thereon, of a hinged cover movable into position to overlie said burner top, said cover comprising a pair of enameled sheet metal panels having telescoping rims, screws extending through both of said rims at the inner edge of said cover, an enameled sheet metal fence secured to said screws and projecting above the upper face of said cover, and a hinge having one leaf secured to said frame and having another leaf secured to said screws.

5. In a range, the combination with a frame having a burner top thereon, of a hinged cover movable into position to overlie said burner top, said cover comprising a pair of enameled sheet metal panels having telescoping rims, a metal reinforcing bar located between said panels adjacent the inner edge of said cover, fastening means securing said bar to both of said rims, and a hinge having one leaf secured to said frame and having another leaf secured to said fastening means.

6. In a range, the combination with a frame having a burner top thereon, of a hinged cover movable into position to overlie said burner top, said cover comprising a pair of enameled sheet metal panels having telescoping rims, a metal reinforcing bar located between said panels, screws securing said rims to each other and to said reinforcing bar, a keeper mounted on said frame, a latch pivotally secured to said cover by one of said screws and adapted to engage said keeper, and a hinge having one leaf secured to said frame and having another leaf secured to certain of said screws.

7. In a range, the combination with a frame having a burner top thereon, of a cover hinged on said frame so as to be movable into position to overlie said burner top, said cover comprising a pair of separately formed sheet metal panels having telescoping rims, one edge of the rim on one of said panels being bent to form a retaining flange engaging the outer face of the other of said panels, a metal reinforcing bar located between said panels, screws securing said rim to each other and to said bar, a sheet metal fence secured to said screws and projecting above said one panel, and a hinge having one leaf secured to said frame and having another leaf secured to said screws.

WALTER F. ROGERS.